Nov. 3, 1970    H. W. MOSER ET AL    3,537,943

SINGLE FACER WITH HEATED BEARINGS

Filed Jan. 15, 1969    2 Sheets-Sheet 1

INVENTORS
HENRY W. MOSER
CHARLES R. NORMAN
BY
Seidel & Gonda
ATTORNEYS

INVENTORS
HENRY W. MOSER
CHARLES R. NORMAN

BY
*Seidel & Gonda*
ATTORNEYS

United States Patent Office 3,537,943
Patented Nov. 3, 1970

3,537,943
SINGLE FACER WITH HEATED BEARINGS
Henry W. Moser, Haddonfield, and Charles R. Norman, Willingboro, N.J., assignors to Harris-Intertype Corporation, Cleveland, Ohio, a corporation of Delaware
Filed Jan. 15, 1969, Ser. No. 791,286
Int. Cl. B31f 1/26, 1/36; F16c 13/00
U.S. Cl. 156—594        8 Claims

ABSTRACT OF THE DISCLOSURE

A single facer corrugating machine is provided with bearings wherein the outer race of a dual race bearing is heated. The bearings may be utilized to support the journal of an internally heated corrugating roll or pressure roll on the single facer. By positively controlling the temperature of the bearing outer race, less vibration and important quality improvement of the manufactured corrugated paperboard are achieved.

---

The bearings for a corrugating roll or pressure roll of a single facer corrugating machine expand due to temperature changes during the first hour or hour and a half of start-up of the machine. The bearing temperature distribution is not constant. The inner and outer races do not expand uniformly, thereby changing the bearing clearances.

The inner race reaches a steady state condition very rapidly, such as within twenty minutes. The outer race requires a much longer period of time such as one hour to one and a half hours. During this heat-up period, typically the bearing clearance is greatly reduced from about .010 inch at start-up to about .001 inch and then back up to about .007 inch when the machine has reached its steady state condition. During this interval, under some conditions, preloading can occur. In order to avoid preloading, which can plastically deform the bearing elements, the bearing is designed with a large amount of internal clearance. This results in excessive bearing deflections during steady state operation.

The bearing temperature differential between the inner and outer races during the steady state operation is approximately 100° F. By preheating the outer race before and during start-up of the machine, it is now possible to control temperature differentials between the races so that the outer race arrives at its steady state tempeature at or before the arrival of the inner race at its steady state temperature. Hence, the internal bearing clearance is maintained at any desired value predicated on the temperature differential during steady state operation.

It is an object of the present invention to provide a heated outer bearing race for the journals of a heated roll of a corrugating machine.

It is an object of the present invention to eliminate the long warm-up period for the outer race of a bearing in a corrugating machine and thereby greatly reduce vibration and sporadic poor quality of paperboard produced during this warm-up period and during operation of the machine.

It is another object of the present invention to provide a corrugating machine wherein heated rollers are supported by bearings whose internal bearing clearance is initially designed for the temperature differential between the races during steady state operation.

It is another object to provide a single facer machine whose motor circuitry has an interlock to prevent operation until the bearing outer race has reached a predetermined temperature.

Other objects will appear hereinafter.

For the purpose illlustrating the invention, there is shown in the drawings a form which is presently preferred; it being understood, however, that this invention is not limited to the precise arrangements and instrumentalities shown.

Figure 1:
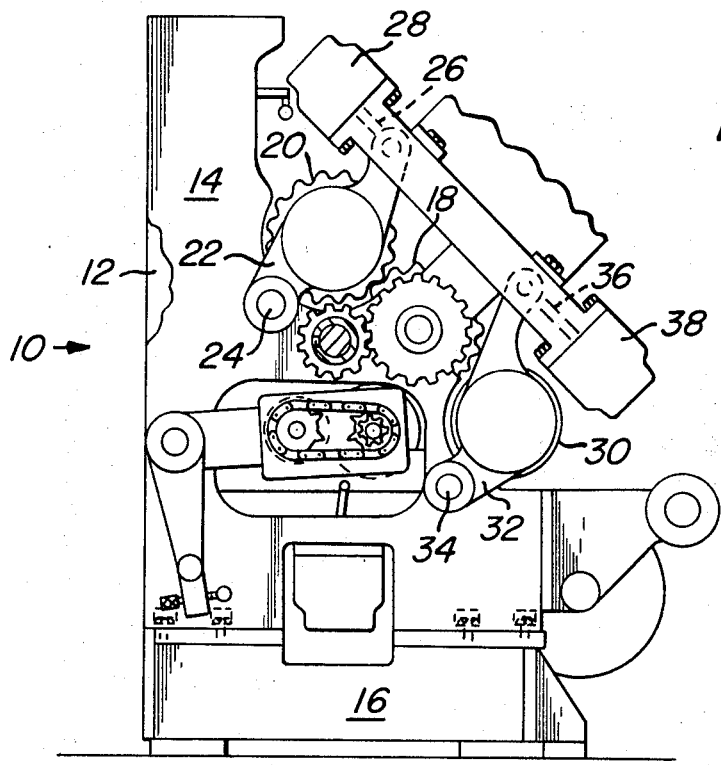
FIG. 1 is an end view of a single facer machine.

Referring to the drawings in detail, wherein like numerals indicate like elements, there is illustrated a single facer machine designated generally as 10 and described in greater detail in U.S. Pat. 3,390,040. Many of the components of the single facer machine 10 are conventional, will be readily understood by those skilled in the art, and need not be discussed in detail.

The machine 10 include a pair of parallel spaced side frames which may be designated as a right side frame 12 and a left side rame 14. The side frames 12 and 14 support the rotating components and are mounted on a bed plate 16 and connected thereto in any convenient manner. The side frames are preferably solid cast iron and removably bolted to the bed plate 16 which is preferably sound-deadened to attenuate vibration. A first or lower corrugating roll 18 is rotatably supported by the side frames 12 and 14. A second or upper corrugating roll 20 is rotatably supported by a pair of lever arms 22 and 22'.

The arms 22 and 22' are mounted on the side frames for pivotable movement about the longitudinal axis of studs 24 and 24'. The arms 22 and 22' are each connected to a rod extending from a fluid motor. Thus, arm 22 is connected to rod 26 on motor 28. The motor form arm 22' is not shown.

A pressure roll 30 i supported for rotation about its longitudinal axis by the side frames 12 and 14. A conventional means not shown is provided for internally heating the rolls 18, 20 and 30. The pressure roll 30 is supported at its ends by arms 32 (only one shown), which are mounted for pivotable movement about the longitudinal axis of studs 34. The arms 32 are likewise connected to a rod extending from a motor. Thus, arm 32 shown is connected to rod 36 extending from the fluid motor 38. The motors 28 are adapted to cause the arms 22 and 22' to move the upper corrugating roll 20 toward the corrugating roll 18. The motors 38 are adapted to move the pressure roll 30 toward the corrugating roll 18.

Figure 2:
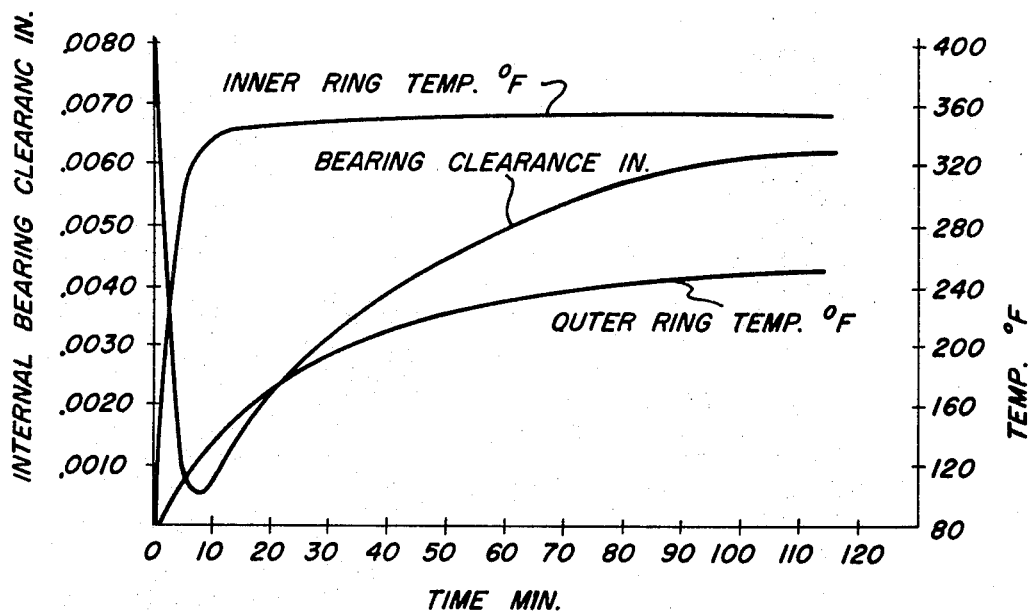
FIG. 2 is a graph illustrating the relationship between internal bearing clearance, time, and temperature with respect to the inner race, outer race, and bearing clearance.

There is shown in FIG. 2 a graph illustrating the relationship between temperature, time and internal bearing clearance for the bearing inner and outer races on the journal for rolls 18, 20 and 30 on a conventional single facer machine. As shown in FIG. 2, the bearing temperature distribution is a function of time. It will be noted that the inner race achieves steady state temperature of approximately 360° F. within the first twenty minutes of operation. It will be noted that the outer race requires approximately an hour and a half to reach its steady state operating temperature of approximately 260° F.

As shown in FIG. 2, the internal bearing clearance which in a cold state is approximately .010 inch, rapidly decreases to less than .001 inch within the first five minutes of operation. Thereafter, the bearing clearance begins to increase as the effect of increase of the outer race temperature becomes effective. At or about the time the outer race reaches its steady state temperature, the internal bearing clearance reaches a steady state of approximtely .006 inch.

In order to accommodate the wide differential in internal bearing clearances, it has been conventional to utilize a special bearing which has excessive internal bearing clearance. Decreasing the internal bearing clearance decreases the bearing deflection, increases bearing stiffness, and distributes the bearing load over a larger number of anti-friction members. Also, decreasing the bearing deflection reduces the corrugating roll vibration and runout. Distributing the bearing load over more anti-friction members reduces the maximum roller load. This provides for a greater fatigue life, better lubrication, and less chance of plastically deforming the anti-friction members as they pass through the load zone. Plastically deformed or flattened anti-friction members are a major cause of bearing vibration.

Figure 3:
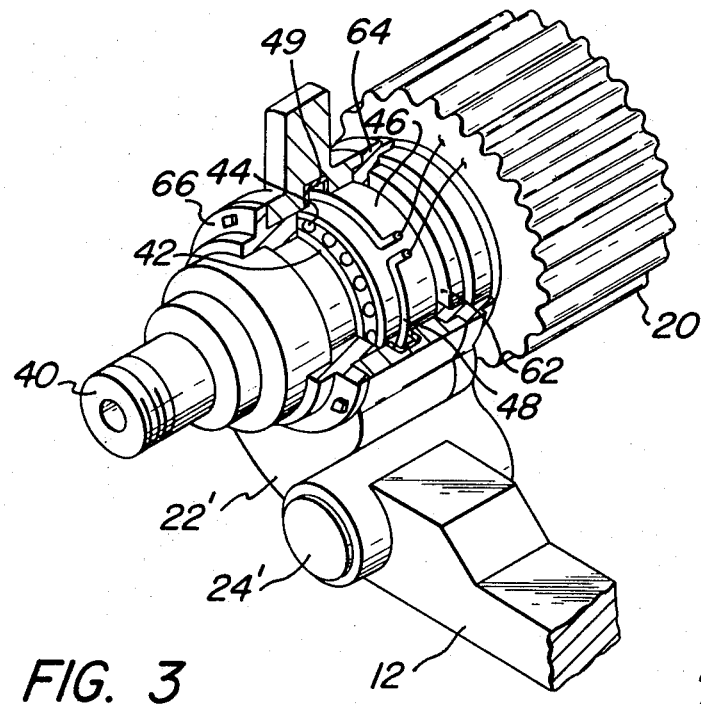
FIG. 3 is a partial perspective view of a corrugating roll from a single facer machine having its journal supported by a double race bearing with the outer race heated in accordance with the present invention.

As shown more clearly in FIG. 3, there is illustrated a partial perspective view of a corrugating roll 20 of the single facer machine 10. The present invention is equally applicable to the bearing for pressure roller 30 and other internally heated rolls in the corrugator such as roll 18. The corrugating roll 20 is provided with a hollow journal 40. Steam or liquid heat carrier medium is fed through the journal 40 and roll 20 to internally heat the same.

The inner race 42 of a dual race bearing is force-fit onto the outer periphery of the journal 40. Hence, race 42 will attain an operating temperature of approximately 360° within a short period of time as will be apparent from a review of FIG. 2. Anti-friction members, such as rollers 44, are disposed between the inner race 42 and the outer race 46. A substantial period of time, such as an hour and a half, is normally required before the outer race 46 attains a steady operating temperature of approximately 260° because of the poor heat transmission through the rollers 44 and the exposure of the outer race 46 to the surrounding elements of the supporting frame such as arm 22'.

In a typical application, a heater element 48 is fixedly secured in close proximity to the outer race 46 in any convenient manner so long as it is in good intimate contact therewith. To accommodate element 48, arm 22' may be provided with the recess 49 lined with insulation material. The ends of the heater element 48 are coupled to a source of electrical potential 50 through a normally open switch 52 and normally closed switch 54. Heater element 48 is controlled by a thermostat 56 which controls switch 58 in the motor control circuit containing relay coil 60. Coil 60 controls switch 54. Until switch 58 is closed, motor 61, which operates rolls 18, 20 and 30 is incapabe of being started.

By preheating the outer race 46 so that it attains a steady state operating temperature of approximately 260° at approximately the same time that the inner race 42 attains a steady state operating temperature of approximately 360°, the internal bearing clearance will vary within narrow limits. Hence, the internal bearing clearance may be maintained at any desired value.

The journal 40 is provided with a shoulder 62. The bearing has one end spaced from shoulder 62 by a sleeve retainer 64. A sleeve retainer 66 engages the other end of the bearing. Retainer 66 is bolted to arm 22'. It will be appreciated that each end of roll 20 is supported in the manner described above and such structure may be provided at each journal for rolls 18 and 30.

The machine 10 is operated as follows:

Switch 52 is manually closed to cause heater element 48 to preheat bearing race 46 to the desired temperature such as 260° F. When bearing outer race 46 reaches the desired temperature, thermostat 56 closes switch 58. The motor control circuit is now closed so that motor 61 may be started and machine 10 placed in operation in a normal manner. At the same time, relay coil 60 in the motor control circuit opens switch 54 to deactivate the heater element 48.

While an electrical heater element for the outer race 46 is faster and therefore preferred, steam could be directed against race 46 to effect a preheating of race 46. If desired, the motor control circuit may be provided with a signal device such as a flashing light 69 in a low voltage circuit responsive to closing switch 67. Switch 67 closes when switch 58 closes. Light 69 indicates that the motor control circuit is closed so that motor 61 may be started.

As is conventional, the motor control circuit is provided with a manual switch means 70 which may be a start-stop switch or separate start and stop switches. In the event that the motor control circuit is not closed or switch 54 is not opened immediately after the bearing race 46 reaches its operating temperature, the temperature of bearing race 46 will continue to increase. In order to prevent overheating, a normally closed switch 72 is provided in series with switch 54. Switch 72 is controlled by thermostat 74. Thermostat 74 is set for a temperature of about 20° F. above thermostat 56. When thermostat 74 is activated, it opens switch 72.

Figure 4:
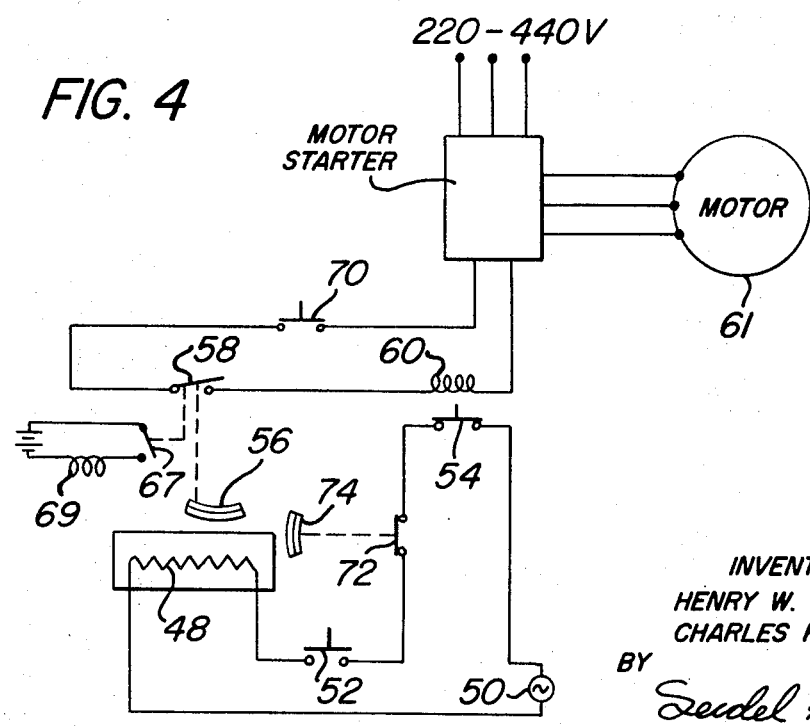
FIG. 4 is a schematic wiring diagram.

It will be appreciated that the circuitry schematically illustrated in FIG. 4 can be revised to include the heaters for the journal bearings for the rolls 18 and 30 in any manner which will be obvious to those skilled in the art.

The present invention may be embodied in other specific forms without departing from the spirit or essential attributes thereof and, acordingly, reference should be made to the appended claims, rather than to the foregoing specification as indicating the scope of the invention.

We claim:

1. Apparatus for producing corrugated paperboard including a rotatable roll internally heated, said roll having a journal, a dual race bearing surrounding said journal, and means for heating the outer race of the bearing to a desired temperature to control the internal clearance between the inner and outer races.

2. Apparatus in accordance with claim 1 wherein said means for heating the outer race includes a heater element in proximity to the outer race, and circuitry including means for interrupting operation of said element when the outer race reaches the desired temperature.

3. Apparatus in accordance with claim 1 wherein said roll is a corrugating roll of a single facer machine.

4. Apparatus in accordance with claim 1 wherein said heating means includes an electical heater element connected to said outer race of the bearing.

5. Apparatus in accordance with claim 1 including a motor for said roll, circuitry including an interlock for preventing said motor from rotating said roll until the temperature of said outer race of the bearing is at a predetermined temperature.

6. Apparatus in accordance with claim 5 wherein said interlock includes a thermostat responsive to the temperature of the outer race.

7. Apparatus in accordance with claim 1 wherein said journal and bearing are supported by a pivotably mounted arm.

8. Apparatus in accordance with claim 1 including means for interrupting said hearing means when the bearing outer race temperature reaches a predetermined temperature above said desired temperaturs so as to prevent overheating the bearing outer race.

References Cited

UNITED STATES PATENTS 1,735,340  11/1929  Smith _____ 156—588
1,892,812  1/1933   Rous _____ 156—588

BENJAMIN A. BORCHELT, Primary Examiner

C. T. JORDAN, Assistant Examiner

U.S. Cl. X.R.

156—588; 308—1